F. H. AND F. O. BALL.
CARBURETER CONTROL MECHANISM.
APPLICATION FILED JUNE 10, 1919.
1,391,931.
Patented Sept. 27, 1921.
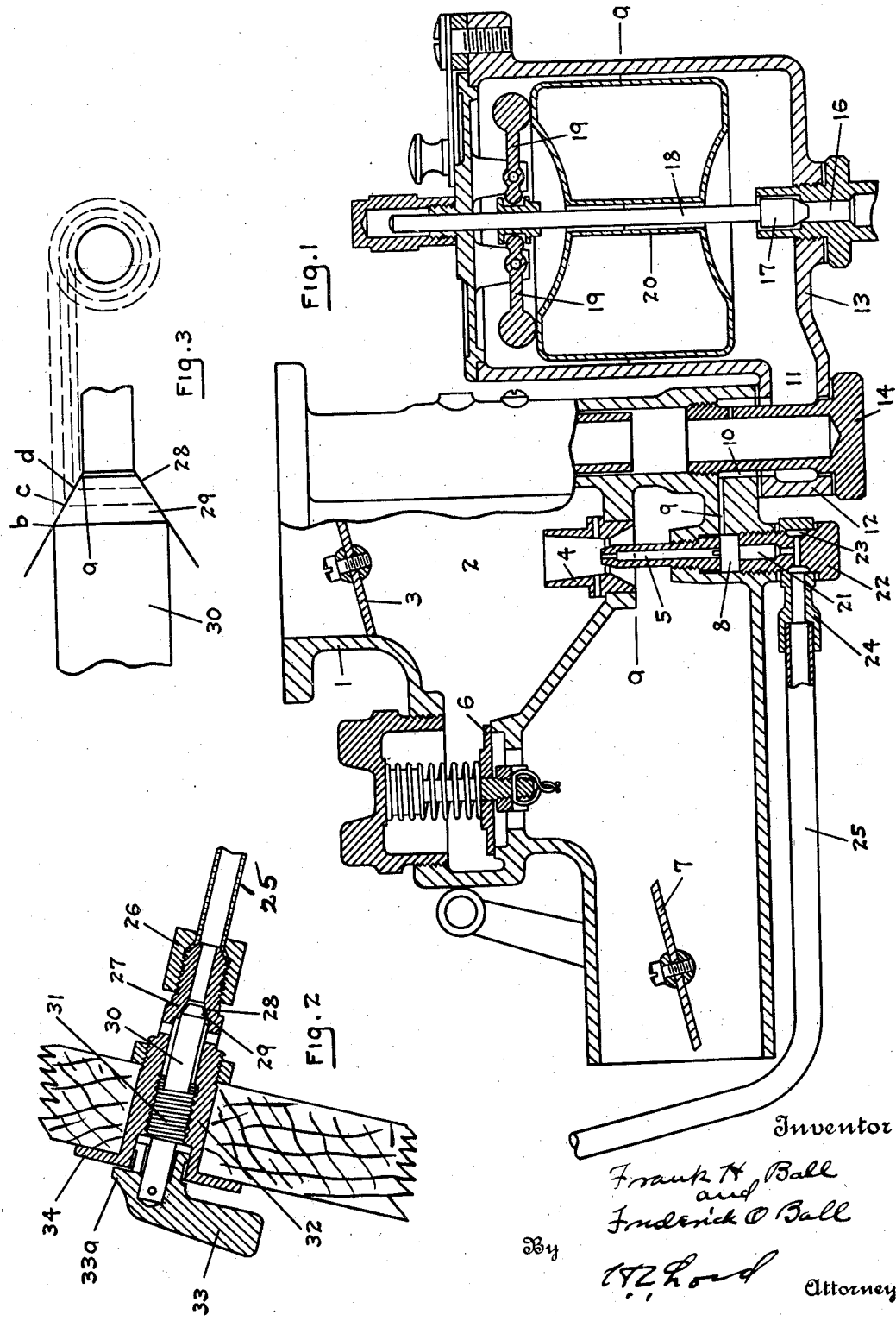
Inventor
Frank H. Ball
and
Frederick O. Ball
By
M. Lord Attorney

UNITED STATES PATENT OFFICE.

FRANK H. BALL AND FREDERICK O. BALL, OF DETROIT, MICHIGAN, ASSIGNORS TO BALL & BALL CARBURETOR COMPANY, OF DETROIT, MICHIGAN, A CORPORATION OF MICHIGAN.

CARBURETER-CONTROL MECHANISM.

1,391,931.   Specification of Letters Patent.   Patented Sept. 27, 1921.

Application filed June 10, 1919. Serial No. 303,209.

*To all whom it may concern:*

Be it known that we, FRANK H. BALL and FREDERICK O. BALL, citizens of the United States, residing at Detroit, in the county of Wayne and State of Michigan, have invented new and useful Improvements in Carbureter-Control Mechanism, of which the following is a specification.

In the use of carbureters it is desirable to vary the mixture or to vary the adjustment of the carbureter so as to maintain a constant mixture. It is often desirable to control this variation of mixture from a point remote from the carbureter, particularly where the carbureter is used on an automobile. Here it is desirable to have the adjustment on the dash of the machine and to have the adjustment so simple in form as to be readily actuated by inexperienced operators. In the present invention this is accomplished by providing a fluid control for the carbureter so that it is only necessary to carry the connection or conduit from the carbureter to the dash, thus doing away with any moving connecting parts.

The invention is illustrated in the accompanying drawings as follows:—

Figure 1 shows a carbureter in section.

Fig. 2 a central section of the dash control.

Fig. 3 a diagram showing variations in the controlling valve openings.

1 marks the body of the carbureter, 2 the suction passage, 3 the throttle, 4 a Venturi tube, 5 the fuel nozzle or passage, 6 an auxiliary air valve, and 7 a choke valve. The elements operate as usual in the ordinary form of carbureter.

The fuel passage 5 leads to an intermediate chamber 8. An fuel conduit 9 leads to the intermediate chamber 8 from an annular passage 10 in the body of the carbureter. The annular passage 10 communicates with a passage 11 in an extension 12 on the float chamber 13. A screw 14 extends through the extension and into the body of the carbureter, the screw forming a means for securing the float chamber to the carbureter and for completing the fuel connection between the float chamber and the conduit 9. The usual gaskets are provided between the extension 11 and the head of the screw 14 at the bottom of the extension and the body of the carbureter at the top of the extension.

The float chamber has the usual fuel supply connection 16 and the controlling valve 17 from which a valve stem 18 extends. Levers 19 communicate the movement of a float 20 to the valve.

An air passage 21 is arranged in a screw plug 22, the screw plug extending into the body of the carbureter. The passage 21 in the screw plug leads from the chamber 8. The plug 22 has radial openings which connect the passage 21 with an annular passage 23 formed in a fitting 24. The fitting 24 is connected with a tube 25 and the tube is connected by a union 26 with a valve 27. The valve has a seat 28 on which a needle valve surface 29 operates. The needle valve has a stem 30 on which is arranged a screw 31 and this operates in a nut 32 carried by the dash. An operating handle 33 is provided which operates over a dial 34 on the dash so as to indicate the adjustment.

In operation with the carbureter at rest the fuel finds the level of the fuel in the float chamber throughout the parts at $a$—$a$. When the carbureter is put in operation fuel is immediately discharged from the nozzle 5 and the reduced pressure at the Venturi tube 4 is communicated to the chamber 8. This reduced pressure is communicated to the fuel in the conduit 9. Air is admitted through the passage 21 and thus modifies the reduction of pressure in the chamber 8 over that which it would obtain if the full reduction of pressure of the Venturi tube were communicated to the chamber 8 without the modified influence of the air introduced through the passage 21. The pressure in the chamber 8, therefore, is between that at the Venturi tube and the atmosphere and it is modified by a variation in the effective opening of the passage 21, that is to say, if more air is admitted through the passage 21 the pressure in the chamber 8 will more nearly approach atmospheric pressure and the fuel fed will be less. On the other hand if less air is delivered through the passage 21 the pressure in the chamber 8 will more nearly approximate the pressure in the Venturi tube than the atmosphere and more fuel will be delivered. In any event the fuel will be swept up from the chamber 8 and carried in the form of a spray through the nozzle 5.

By extending the passage 21 as through a tube 25 the point of control of the pressure in the chamber 8 may be placed at any convenient point remote from the carbureter as in an automobile on the dash, the controlling device is shown in section as it would ordinarily be applied on the dash of an automobile.

With this method of control a variation in the flow of air to the chamber 8 makes a uniform or pre-determined variation in the mixture throughout the range of the carbureter so that with the mere variation of the needle valve at the dash the carbureter may be adjusted for all qualities of fuel and for all conditions of temperature. At the same time there is no moving part required between the carbureter and the dash so far as this adjustment is concerned.

It is desirable to have equal movements of the handle 33 with its pointer 33$^a$ over the dial 34 result in equal responses in variations of the mixture at the carbureter. The ordinary needle valve with its point extending beyond the valve seat opens with increments gradually decreasing, that is to say, each additional gap is controlled by a fixed position (the most contracted point) on the valve seat and a retracting point on the surface of the valve opposite the most restricted portion of the value seat. Owing to the variations in resistance of a fluid through a conduit it is desirable in order to get equal responses of the carbureter to have the valve opening increase rather than decrease with each given movement of the handle. This is accomplished by having the needle valve surface so limited as to the surface of the valve seat that the gap is controlled by the distance between the edge $a$ of the valve and various points $b$, $c$ and $d$ on the seat. Where this is done as will be readily seen by the annular dashed spaces indicating the gap at the various points it will be noted that the gap increases in area as the valve is opened. As compared with the action of the ordinary needle valve it will be noted as the valve opens the gap is in the form of an annulus. The inner diameter of this annulus represented by the flap face of the valve remains constant but the outer circumference of the annulus increases to the diameter of the part of the valve seat opposite the point $a$, whereas with the ordinary needle with its point extending through the end of the seat the annulus forming the gap has its outer diameter constant and as the valve is opened the inner diameter of the gap is decreased to the diameter of that part of the needle valve opposite the point of greatest restriction in the seat. By applicant's construction equal movements of the handle can be made to give equal responses in the variations of the mixture.

It will be noted that the co-acting valve surfaces are quite extended with relation to the size of the valve so that with the initial opening of the valve these surfaces are practically parallel and there is a thin stream of air passing between these surfaces which is subjected to friction as a large element of the control of the flow of air. The variation in the resistance to the flow of air incident to friction is somewhat different than the variation following the flow of air through a mere restriction and this variation makes the control of air through the intermediate chamber more efficient particularly in the early stages of the opening of the valve.

What we claim as new is:—

1. In a carbureter control mechanism, the combination of a carbureter comprising devices for delivering fuel and air to form an explosive mixture; a controlling device; a fluid connection between the controlling device and the carbureter; and means on the carbureter for modifying the mixture through the action of a fluid in the connection, said device and means being correlated to produce with equal movements of the controlling device equal variations in the mixture.

2. In a carbureter control mechanism, the combination of a controlling device comprising a valve having a conical seat, the gap between the valve and seat varying in position on the seat as the valve is opened; a fluid connection between the controlling device and the carbureter; and means on the carbureter modifying the mixture through the action of a fluid in the connection controlled by said device.

3. In a carbureter control mechanism, the combination of a carbureter comprising a suction passage; devices for supplying an explosive mixture comprising as elements air and fuel to said passage; means for varying the quality of the mixture; a conduit leading from said means; and controlling devices for said conduit positioned at a point remote from the carbureter, said last-mentioned devices comprising an actuating element increasing the ratio of opening in the conduit with a given movement of the element.

4. In a carbureter control mechanism, the combination of a carbureter comprising a suction passage; a fuel delivery passage leading to the suction passage; a controlling chamber from which the fuel delivery passage leads; a fuel conduit leading to the chamber; and an air connection leading to the chamber; and controlling devices on the connection remote from the carbureter for varying the effective area of the connection, said devices comprising means for effecting with a given movement of said devices equal response in variations of the mixture through the action of the air in the controlling chamber.

In testimony whereof we have hereunto set our hands.

FRANK H. BALL,
FREDERICK O. BALL.